United States Patent [19]

Shioi et al.

[11] Patent Number: 4,657,591
[45] Date of Patent: Apr. 14, 1987

[54] INK COMPOSITION

[75] Inventors: Keiko Shioi; Yasushi Okuda, both of Osaka, Japan

[73] Assignee: Sakura Color Products Corp., Osaka, Japan

[21] Appl. No.: 590,913

[22] Filed: Mar. 15, 1984

[30] Foreign Application Priority Data

Mar. 18, 1983 [JP] Japan ............................ 58-046861

[51] Int. Cl.$^4$ ............................................ C09D 11/00
[52] U.S. Cl. ......................................... 106/23; 106/22
[58] Field of Search .............................. 106/20, 22, 23

[56] References Cited

U.S. PATENT DOCUMENTS 3,406,137 10/1968 Terry et al. ........................ 260/28.5
4,147,823 4/1979 Lavallee ................................. 106/20

FOREIGN PATENT DOCUMENTS 695548 8/1953 United Kingdom .

OTHER PUBLICATIONS

Derwent Abstract, Accession No. 76-23053X/13, Japanese Patent No. J51016127-A, Feb. 9, 1976.
Derwent Abstract, Accession No. 79-17107B/09, Japanese Patent No. J54010023-A, Jan. 25, 1979.
Derwent Abstract, Accession No. 80-88966C/50, Japanese Patent No. J55137996-A.
Derwent Abstract, Accession No. 69376, Japanese Patent No. J57111364, 12/27/80.

Primary Examiner—Amelia B. Yarbrough
Attorney, Agent, or Firm—Wenderoth, Lind & Ponack.

[57] ABSTRACT

An ink composition for writing on an absorbent or pervious writing surface to form thereon a writing or marking composed of an inner portion of a metallic color with outer contour portions therearound of a dyestuff-based color, which composition comprises:
a nonleafing metal powder pigment as a first pigment,
an inorganic or organic pigment as a second pigment,
a dyestuff, and
a solvent,
the nonleafing metal powder pigment being dispersed in the solvent and having a particle size sufficiently large so as to substantially not permeate or be absorbed into the writing surface, and
the second pigment being dispersed in the solvent and either having a particle size sufficiently large so as to substantially not permeate or be absorbed into the writing surface, or having a particle size sufficiently large so as to substantially be adsorbed on the nonleafing metal powder pigment,
the dyestuff being dissolved in the solvent, being capable of substantially permeating or being absorbed into the writing surface and diffusing into the area on the writing surface proximate to the writing,
whereby the nonleafing metal powder pigment forms in conjunction with the second pigment the inner portion of the metallic color, and the dyestuff forms the outer contour portions of the dyestuff-based color around the inner portion.

17 Claims, No Drawings

INK COMPOSITION

The present invention relates to an ink composition for writing on an absorbent or pervious writing surface to provide a writing or marking composed of an inner portion of a first metallic color with outer contour portions therearound of a dyestuff-based second color enclosing the inner portion.

Various color ink compositions, water-base or solvent-base, have been in use for providing a writing or marking on a writing surface. However, such a conventional writing or marking has a single color based on a pigment or dyestuff incorporated therein.

There is recently disclosed an ink composition which when applied to an absorbent or pervious writing surface, provides on the surface a polychromatic writing or marking. In Japanese Patent Disclosure No. 57-111364 is disclosed an ink composition which comprises a solvent, at least one of a dyestuff and a finely divided pigment, inorganic or organic, and a metal powder pigment, wherein the dyestuff is dissolved in the solvent, the finely divided pigment is dispersed in the solvent and has a particle size sufficiently small so as to substantially permeate or be absorbed into an absorbent or pervious writing surface, and the metal powder pigment is dispersed in the solvent wherein the pigment has a particle size sufficiently large so as to substantially not permeate or be absorbed into the absorbent or pervious writing surface.

Therefore when the ink composition is applied to the writing surface, the metal powder pigment forms an inner portion of a first color of a writing or marking on the surface, while the dyestuff or the finely divided pigment permeates or is absorbed together with the solvent into the writing surface and diffuses into the area on the writing surface proximate to the inner portion, thereby the dyestuff or the finely divided pigment forms the outer contour portions around the inner portion.

A further ink composition is disclosed in Japanese Patent Disclosure No. 59-6271. The ink composition typically includes a solvent, a first pigment such as a metal powder pigment dispersed in the solvent, a second pigment also dispersed in the solvent, but smaller in the particle size than in the first pigment, and a dyestuff dissolved in the solvent. Therefore, when the ink composition is applied to an absorbent or pervious writing surface, the first pigment is trapped on the surface to form an inner portion of a writing or marking on the writing surface, the second pigment permeates or diffuses into the writing surface to some extent together with the solvent in the area on the writing surface proximate to the writing or marking to form an intermediate contour portions around the inner portion, and the dyestuff permeates or diffuses into the outside area on the surface proximate to the intermediate contour portion to form the outermost contour portions therearound.

As apparent, the prior ink composition as above provides a polychromatic writing or marking composed of an inner portion of a first color and outer contour portions of a second color therearound. The thus formed inner portion of the writing has a metallic luster based on the metal powder pigment used such as aluminum, bronze or copper, but the inner portion fails to have a metallic color, that is, a color with metallic luster with a color.

On the other hand, an ink composition is also known in Japanese Patent Disclosure No. 57-28716, which ink composition, when being applied to an impervious writing surface such as metal, glass or resin, provides a writing or marking of a metallic color. However, according to the Disclosure, the incorporation of leafing metal powder pigment into the ink composition is essential to provide a sharp and clear writing of a metallic color on such impervious surfaces.

It is therefore an object of the present invention to provide an ink composition for writing on an absorbent or pervious writing surface to form thereon a writing or marking composed of an inner portion of a first metallic color with outer contour portions of a dyestuff-based second color.

An ink composition of the invention for writing on an absorbent or pervious writing surface to form thereon a writing or marking composed of an inner portion of a metallic color with outer contour portions therearound of a dyestuff-based color, which composition comprises:

a nonleafing metal powder pigment as a first pigment,
an inorganic or organic pigment as a second pigment,
a dyestuff, and
a solvent,
the nonleafing metal powder pigment being dispersed in the solvent and having a particle size sufficiently large so as to substantially not permeate or be absorbed into the writing surface, and
the second pigment being dispersed in the solvent and either having a particle size sufficiently large so as to substantially not permeate or be absorbed into the writing surface, or having a particle size sufficiently large so as to substantially be adsorbed on the nonleafing metal powder pigment,
the dyestuff being dissolved in the solvent, being capable of substantially permeating or being absorbed into the writing surface and diffusing into the area on the writing surface proximate to the writing,
whereby the nonleafing metal powder pigment forms in conjunction with the second pigment the inner portion of the metallic color, and the dyestuff forms the outer contour portions of the dyestuff-based color around the inner portion.

The nonleafing metal powder pigment used in the invention has a particle size sufficiently large so as to substantially not permeate or be absorbed into the writing surface. That is, the pigment has a particle size sufficiently large so as to be trapped and fixed on the fibrous network of an absorbent or pervious writing surface such as paper or cloth when the ink composition is applied thereonto while the solvent permeates and diffuses into the fibrous network of the writing surface. The nonleafing metal powder pigment is therefore preferably not less than 1 micron in the average particle size, although somewhat depending on the chemical and physical properties of the fibrous network of the writing surface, the ingredients and viscosity of the ink composition, the surface properties and densities of the pigment used, etc. More preferably, the nonleafing metal powder pigment is 2-120 microns, most preferably 3-100 microns, in the average particle size so as to be readily trapped and fixed on the writing surface. The ink composition of the invention includes the nonleafing metal powder pigment in amounts of 1-30% by weight, preferably 2-20% by weight, based on the ink composition.

As is well known in the field of coating technology, metal powder pigments are classified into two; types a leafing type and a nonleafing type. The leafing metal powder pigment is coated, for example, with a saturated fatty acid such as stearic acid, and it is orientatedly floatable on the surface of coating, to thereby form a thin and continuous layer of metal powder on the surface of coating. On the contrary, the nonleafing metal powder pigment is coated, for example, with a unsaturated fatty acid such as oleic acid, and it is uniformly dispersable in the coating.

The metal powder pigment used in the ink composition of the present invention is restricted to the nonleafing metal powder pigment so that the pigment is dispersed unorientatedly in the writing together with the second pigment on an absorbent or pervious writing surface, thereby to provide an inner portion of metallic color of the writing in conjunction with the second pigment.

When a leafing metal powder pigment is used in place of the nonleafing metal powder pigment, the leafing metal powder pigment covers the surface of the inner portion of the writing as stated above to hide the color based on the second pigment, so that the ink composition which includes the leafing metal powder pigment fails to provide a metallic-colored inner portion an absorbent or pervious writing surface.

Some examples of the nonleafing metal powder pigment are aluminum powder pigment, bronze powder pigment and copper powder pigment. A so-called metal powder paste composed of a metal powder dispersed in a solvent, either water or an organic solvent, is advantageously used since it is easy to handle and is readily available.

The second pigment is at least one member selected from the group consisting of an inorganic pigment and an organic pigment except the metal powder pigment. The inorganic pigment includes carbon black, titanium oxide, red iron oxide, ultramarine blue, cobalt green, cobalt blue, yellow ochre, viridian, and cadmium yellow. The organic pigment includes insoluble azopigments such as Quinacridone Violet (C.I. Pigment 19), Permanent FB (C.I. Pigment Red 5), Hansa Yellow 10G (C.I. Pigment Yellow 3) and phthalocyanine-copper complexes such as Phthalocyanine Blue.

The second pigment may usually be not less than 0.3 microns in the average particle size so as to either substantially not permeate or be absorbed in the writing surface, or substantially be adsorbed on the metal powder pigment. More preferably the second pigment is not less than 1 micron, and most preferably not less than 2 microns, in the average particle size. The ink composition of the invention includes the second pigment in amounts of 1–30% by weight, preferably 2–20% by weight, based on the ink composition.

The ink composition of the invention includes a dyestuff which is soluble in the solvent used therein and is capable of substantially permeating or being absorbed and diffusing into the fibrous network on an absorbent or pervious writing surface proximate to the inner portion of the writing together with the solvent when the ink composition is applied to the writing surface, so as to form the outer contour portions of the dyestuff-based color of the writing. Any dyestuff may be used which has heretofore been used for incorporation into conventional ink compositions. For a water-base ink composition, a dyestuff may be used such as a basic, an acid and a direct dyestuff, and for a solvent-based ink composition, a variety of oil-soluble and spirit-soluble dyestuffs may be used depending on the solvent used.

The dyestuff is contained in an amount of 0.05–20% by weight, preferably 0.2–10% by weight, based on the ink composition.

Here in the present invention, a finely divided inorganic and organic pigment may be used in place of a dyestuff or therewith when the finely divided inorganic and organic pigment have a particle size sufficiently small to substantially be absorbed or diffuse into an absorbent or pervious writing surface together with the solvent used like a dyestuff.

Any solvent may be used as a vehicle of the ink composition of the invention depending upon whether a water-base or solvent-base is intended. In a water-base composition, water, or a mixture of water and a water-soluble organic solvent is used. As a water-soluble organic solvent may be used, for example, a $C_1$–$C_8$ monohydric and polyhydric alcohol such as ethanol, propanol, glycerine, ethyleneglycol, propyleneglycol, diethyleneglycol, dipropyleneglycol and ethyleneglycol monoalkylether such as ethyleneglycol monoethylether and monobutylether, and a $C_3$–$C_{10}$ aliphatic and alicyclic ketone such as methyl ethyl ketone and cyclohexanone. In particular, the incorporation of a lower aliphatic alcohol such as propanol, ethyleneglycolol monoethylether and/or a ketone such as methyl ethyl ketone is preferred to enhance the permeability of the ink composition into an absorbent fibrous network of the writing surface. On the other hand, A polyhydric alcohol such as glycerine and ethyleneglycol serve to lower the loss of volatile components due to the evaporation thereof in the ink composition.

The water-base ink composition may further contain urea or thiourea therein to achieve more smooth writing therewith since urea or thiourea depresses very effectively the evaporation of water and other volatile components in cooperation with the polyhydric alcohol. The water-base ink composition preferably further contains effective amounts of surfactant so that the pigment is uniformly dispersed therein and that the ink composition has a higher permeability into the fibrous network of the writing surface when applied thereto. Any surfactant may be used, for example, a polyoxyethylene alkylether, a sorbitan fatty acid ester, an alkylammonium halide, and an alkylaryl sulfonate.

In a solvent-base ink composition, an organic solvent may be used, for example, a $C_6$–$C_{10}$ alicyclic hydrocarbon such as cyclohexane, methylcyclohexane, ethylcyclohexane and dimethylcyclohexane, a $C_5$–$C_{12}$ aliphatic hydrocarbon such as n-hexane and n-octane, a $C_6$–$C_{10}$ aromatic hydrocarbon such as benzene, toluene and xylene, a $C_3$–$C_{10}$ aliphatic, alicyclic and aromatic ketone such as methyl ethyl ketone, methyl isobutyl ketone, cyclohexanone and acetophenone, a $C_4$–$C_{10}$ aliphatic carboxylic acid alkyl ester such as ethyl acetate, butyl acetate, butyl propionate and amyl acetate, an alicyclic ester such as cyclohexyl acetate, an aromatic ester such as benzyl acetate, an aromatic acid alkyl ester such as methyl benzoate, a $C_1$–$C_6$ aliphatic alcohol such as ethanol, propanol, butanol, an ethyleneglycol monoalkylether such as ethyleneglycol monoethylether and ethyleneglycol monobutylether, an ethyleneglycol monoalkylester such as ethyleneglycol monoacetate, and a mixture of two or more of these.

The ink composition of the invention, water-base or solvent base, contains the solvent as above in amounts of 40–97% by weight, preferably 50–95% by weight, based on the ink composition. The amounts of the colorant and solvent are selected so that the ink composition has a desired viscosity for writing in consideration of the amount of a resin preferably used in the ink composition.

The ink composition of the invention preferably contains a resin in amounts not more than 30% by weight, preferably 1–20% by weight, based on the ink composition, so as to have a viscosity suitable for writing therewith. Any resin may be used depending upon the solvent used. A water-soluble resin is used in a water-base ink composition, and sodium carboxymethylcellulose, polyvinyl alcohol and polyvinyl pyrrolidone, for example, are preferably used in the invention. In a solvent-base ink composition, on the other hand, a resin soluble in the solvent used is incorporated into the ink composition. For example, a natural resin such as rosin, a rosin modified resin such as rosin ester, rosin modified maleic acid resin and rosin modified phenol resin, other phenol resins, a petroleum resin, a ketone resin, an alkyd resin, a xylene resin, an indene-coumarone resin, a cellulose resin such as ethylcellulose and acetylcellulose, polyvinylbutyral resin, a vinyl chloride-vinyl acetate copolymer, a vinylidene chloride-acrylonitrile copolymer, a vinylidene chloride-vinyl chloride copolymer and a mixture of two or more of these may be employed.

When necessary, the ink composition of the invention may further contain an effective amount of additional additives such as an antiseptic, e.g., sodium benzoate and potassium sorbate, and a plasticizer, e.g., dioctyl phthalate and tricresyl phosphate. A rust-preventive agent may also be contained in the ink composition.

When a writing or marking is formed on an absorbent or pervious writing surface such as paper with the ink composition of the invention, the nonleafing metal powder pigment is trapped and fixed unorientedly on the absorbent writing surface along the writing or marking, and the second pigment is also trapped and fixed together with metal powder pigment, or is adsorbed on the metal powder pigment. Thus, the nonleafing metal powder pigment forms an inner portion of the writing of a first metallic color in conjunction with the second pigment. That is, the inner portion of the writing has a first color with metallic luster based on a mixture of the metal powder and the second pigment.

The dyestuff dissolved in the solvent may also in part form the inner portion of the writing together with the pigments, but the residual material permeates and is absorbed into the writing surface together with the solvent to reach the outside area on the writing surface proximate to the inner portion of the writing, thereby to form outer contour portions of a second color around the inner portion of the writing so as to enclose therein the inner portion. That is, a dual color writing is formed which is composed of the inner portion of a first color with metallic luster and the outer contour portions of a dyestuff-based secondcolor around the inner portion. The color of the outer contour portions is thus based solely on the dyestuff.

The ink composition of the invention is applied to an absorbent or pervious writing surface preferably with a so-called marking pen which is provided with a writing felt-tip to form a writing or marking about 1–50 mm in width, however, the ink composition of the invention is not restricted to any writing tool when being applied.

The ink composition of the invention may be prepared by any method known in the ink composition field. For example, a resin, and when necessary, a surfactant, an antiseptic and a plasticizer, are added to a solvent and stirred, and then to the resultant solution is added a dyestuff and the mixture is stirred for a sufficent period of time under heating if necessary. Then a metal powder pigment is added to the solution and stirred for a period of time sufficient to provide a uniform ink composition. All the components may be added to a solvent at the same time if desired. Any dispersing means such as a ball mill may be used in the preparation if necessary.

The present invention will be more easily understood with reference to the following examples, which however are intended to illustrate the invention only and are not to be construed to limit the scope of the invention, and in the examples quantities of components are expressed in parts by weight.

EXAMPLE 1

Aluminum powder paste (Alpaste 1880YL containing 64% by weight of nonleafing aluminum powder, Toyo Aluminum K.K.): 5.0
Chromophthal RED 2R (Ciba-Geigy): 5.0
Oil Yellow 105 (Orient Kagaku K.K.): 3.0
Acrylic resin (Almatex L1042, Mitsui-Toatsu Kagaku K.K.): 5.0
Ketone resin (Hirac 111, Hitachi Kasei K.K.): 5.0
Xylene: 77.0

This solvent-base ink composition, when applied to paper, forms a writing composed of an inner portion of metallic red, and outer contour portions therearound of yellow.

EXAMPLE 2

Aluminum powder paste (Alpaste 7790N containing 64% by weight of nonleafing aluminum powder, Toyo Aluminum K.K.) 10.0
Sanyo Threne Blue IRN (Sanyo Shikiso K.K.): 10.0
Oil Orange 826N (Chuo Gosei Kagaku k.k.): 5.0
Rosin ester (Pencel A, Arakawa Kagaku Kogyo K.K.): 8.0
Petroleum resin (Nisseki Neo Polymer 140, Nihon Sekiyu Kagaku K.K.): 5.0
Xylene: 51.8
Ethylcyclohexane: 10.0
Dispersant: 0.2

This solvent-base ink composition, when applied to paper, forms a writing composed of an inner portion of metallic blue, and outer contour portions therearound of orange.

EXAMPLE 3

Aluminum powder paste (Alpaste 8880YF containing 64% by weight of nonleafing aluminum powder, Toyo Aluminum K.K.): 5.0
Hanza Yellow 3G (Hoechst): 10.0
Oil Pink 312 (Orient Kagaku K.K.): 4.0
Neozapon Blue FLE (BASF): 1.0
Ketone resin (loc. cit.): 5.0
Xylene: 70.0
n-Butyl acetate: 5.0

This solvent-base ink composition, when applied to paper, forms a writing composed of an inner portion of metallic yellow, and outer contour portions therearound of purple.

EXAMPLE 4

Aluminum powder paste (Alpaste 1880YL, loc. cit.): 5.0
Heliogen Green G (BASF): 5.0

Oil Yellow 105 (loc. cit.): 2.5
Neozapon Blue FLE (BASF): 2.5
Ketone resin (loc. cit.): 5.0
Petroleum resin (loc. cit.): 10.0
Xylene: 69.9
Dispersant: 0.1

This solvent-base ink composition, when applied to paper, forms a writing composed of an inner portion of metallic pale green, and outer contour portions of dark green therearound.

EXAMPLE 5

Aluminum powder paste (Alpaste 1500MA containing 70% by weight of nonleafing aluminum powder, Toyo Aluminum K.K.): 15.0
Mikuni SR White JR (Mikuni Shikiso K.K.): 2.0
Mikuni SR Blue HBT (Mikuni Shikiso K.K.): 8.0
Aizen Acid Phloxin PB (Hodogaya Kagaku Kogyo K.K.): 5.0
Water: 49.8
Glycerine: 5.0
Ethyleneglycol: 15.0
Surfactant: 0.2

This water-base ink composition, when applied to paper, forms a writing composed of a metallic blue inner portion and outer contour portions of red therearound.

EXAMPLE 6

Aluminum powder paste (Alpaste 1500MA, loc. cit.): 10.0
Dainichi Lithol Red (Dainichi Seika Kogyo K.K.): 8.0
Water Blue 9 (Orient Kagaku Kogyo K.K.): 2.0
Water: 56.8
Ethyleneglycol: 20.0
Ethyleneglycol monobutylether: 2.0
Sodium benzoate: 1.0
Anti-rusting agent: 0.2

This water-base ink composition, when applied to paper, forms a writing composed of an inner portion of metallic red, and outer contour portions therearound of blue.

EXAMPLE 7

Bronze powder (HRS 450, Fukuda Kinzokuhaku Kogyo K.K.): 6.0
Cyanine Green B (Dainippon Ink Kagaku Kogyo K.K.): 6.0
Oil Yellow 185 (Chuo Gosei Kagaku K.K.): 3.0
Petroleum resin (loc. cit.): 10.0
Xylene: 55.0
Methyl isobutyl ketone: 20.0

This solvent-base ink composition, when applied to paper, forms a writing composed of an inner portion of metallic green, and outer contour portions therearound of yellow.

What is claimed is:

1. An ink composition for writing on an absorbent or pervious writing surface to form thereon a writing or marking composed of an inner portion of a metallic color with outer contour portions therearound of a dyestuff-based color, which composition consists essentially of:
    a nonleafing metal powder pigment as a first pigment,
    an inorganic pigment other than a metal powder or organic pigment as a second pigment,
    a dyestuff, and
    a solvent,
    the nonleafing metal powder pigment being dispersed in the solvent and having a particle size sufficiently large so as to substantially not permeate or be absorbed into the writing surface, and
    the second pigment being dispersed in the solvent and either having a particle size sufficiently large so as to substantially not permeate or be absorbed into the writing surface, or having a particle size sufficiently large so as to substantially be absorbed on the nonleafing metal powder pigment,
    the dyestuff being dissolved in the solvent, being capable of substantially permeating or being absorbed into the writing surface and diffusing into the area on the writing surface proximate to the writing,
    whereby the nonleafing metal powder pigment forms in conjunction with the second pigment the inner portion of the metallic color, and the dyestuff forms the outer contour portions of the dyestuff-based color around the inner portion.

2. The ink composition as claimed in claim 1 wherein the solvent is water or a mixture of water and at least one water-soluble organic solvent.

3. The ink composition as claimed in claim 1 wherein the solvent is at least one member selected from the group consisting of an alicyclic hydrocarbon, an aliphatic hydrocarbon, an aromatic hydrocarbon, an aliphatic, alicyclic and aromatic ketone, an aliphatic carboxylic acid alkyl ester, alicyclic ester and aromatic ester, alicyclic carboxylic acid alkyl ester, aromatic carboxylic acid alkyl ester, an aliphatic alcohol, an ethyleneglycol monoether, and an ethyleneglycol monoester.

4. The ink composition as claimed in claim 1 which comprises:
    40–97% by weight of the solvent,
    not more than 30% by weight of the resin,
    1–30% by weight of the nonleafing metal powder pigment,
    1–30% by weight of the second pigment, and
    0.05–20% by weight of the dyestuff.

5. The ink composition as claimed in claim 4 wherein the nonleafing metal powder pigment is not less than 1 micron, and the second pigment is not less than 0.3 microns, respectively, in the average particle size.

6. The ink composition as claimed in claim 5 wherein the second pigment is not less than 1 micron in the average particle size.

7. The ink composition as claimed in claim 4 wherein the nonleafing metal powder pigment is not less than 2 microns, and the second pigment is not less than 2 microns, respectively, in the average particle size.

8. The ink composition as claimed in claim 1 which further comprises effective amounts of at least one additives selected from the group consisting of a surfactant, an antiseptic and a rust-preventive agent.

9. The ink composition as claimed in claim 4 which comprises:
    50–95% by weight of the solvent,
    1–20% by weight of the resin,
    2–20% by weight of the nonleafing metal powder pigment,
    2–20% by weight of the second pigment, and
    0.2–10% by weight of the dyestuff,
    the nonleafing metal powder pigment being not less than 1 micron, and the second pigment being not less than 0.3 microns, respectively, in the average particle size.

10. The ink composition as claimed in claim 9 wherein the the second pigment is not less than 1 micron in the average particle size.

11. The ink composition as claimed in claim 9 wherein the nonleafing metal powder pigment is not less than 2 microns, and the second pigment is not less than 2 microns, respectively, in the average particle size.

12. The ink composition as claimed in claim 9 wherein the solvent is water or a mixture of water and at least one water-soluble organic solvent.

13. The ink composition as claimed in claim 9 wherein the solvent is at least one member selected from the group consisting of an alicyclic hydrocarbon, an aliphatic hydrocarbon, an aromatic hydrocarbon, an aliphatic, alicyclic and aromatic ketone, an aliphatic carboxylic acid alkyl ester, alicyclic ester and aromatic ester, alicyclic carboxylic acid alkyl ester, aromatic carboxylic acid alkyl ester, an aliphatic alcohol, an ethyleneglycol monoether, and an ethyleneglycol monoester.

14. The ink composition as claimed in claim 9 which further comprises effective amounts of at least one additives selected from the group consisting of a surfactant, an antiseptic and a rust-preventive agent.

15. A method for writing on an absorbent or pervious writing surface to form thereon a writing or marking composed of an inner portion of a metallic color with contour portions therearound of a dyestuff-based color, which comprises applying to said surface an ink composition, which composition consists essentially of:
   a nonleafing metal powder pigment as a first pigment,
   an inorganic pigment other than a metal powder or organic pigment as a second pigment,
   a dyestuff, and
   a solvent,
   the nonleafing metal powder pigment being dispersed in the solvent and having a particle size sufficiently large so as to substantially not permeate or be absorbed into the writing surface and;
   the second pigment being dispersed in the solvent and either having a particle size sufficiently large so as to substantially not permeate or be absorbed into the writing surface, or having a particle size sufficiently large so as to substantially be absorbed on the nonleafing metal powder pigment,
   the dyestuff being dissolved in the solvent, being capable of substantially permeating or being absorbed into the writing surface and diffusing into the area on the writing surface proximate to the writing,
   whereby the nonleafing metal powder pigment forms in conjunction with the second pigment of the inner portion of the metallic color, and the dyestuff forms the outer contour portions of the dyestuff-based color around the inner portion.

16. The method according to claim 15 wherein the ink is applied with a felt tip marker.

17. The method according to claim 15 wherein the marking is about 1–50 mm. in width.

* * * * *